US007628501B2

(12) United States Patent
Obermeier et al.

(10) Patent No.: US 7,628,501 B2
(45) Date of Patent: Dec. 8, 2009

(54) JUKEBOX OR VENDING MACHINE HAVING A LIGHTING SYSTEM

(75) Inventors: Jürgen Obermeier, Hüllhorst (DE); Norbert Wolf, Lübbecke (DE)

(73) Assignee: Deutsche Wurlitzer GmbH, Stemwede-Levern (DE)

( * ) Notice: Subject to any disclaimer, the term of this patent is extended or adjusted under 35 U.S.C. 154(b) by 58 days.

(21) Appl. No.: 12/075,994

(22) Filed: Mar. 14, 2008

(65) Prior Publication Data

US 2008/0225511 A1 Sep. 18, 2008

(30) Foreign Application Priority Data

Mar. 15, 2007 (DE) ....................... 10 2007 012 396

(51) Int. Cl.
*H04M 1/22* (2006.01)

(52) U.S. Cl. ............................ 362/86; 362/87; 362/89; 362/253; 362/276; 362/802

(58) Field of Classification Search .................. 362/86, 362/87, 89, 253, 276, 802; 463/16, 20
See application file for complete search history.

(56) References Cited

U.S. PATENT DOCUMENTS

| | | | | |
|---|---|---|---|---|
| 6,779,904 | B1 * | 8/2004 | Van Dyk | 362/86 |
| 2004/0132522 | A1 | 7/2004 | Seelig et al. | |
| 2005/0255907 | A1 | 11/2005 | Gauselmann et al. | |

FOREIGN PATENT DOCUMENTS

| | | |
|---|---|---|
| EP | 1 770 674 | 9/2006 |
| JP | 2006 119268 | 11/2006 |

* cited by examiner

*Primary Examiner*—Sandra L O'Shea
*Assistant Examiner*—Meghan K Dunwiddie
(74) *Attorney, Agent, or Firm*—Neil A. Steinberg

(57) ABSTRACT

The invention relates to a jukebox or vending machine provided with a lighting system. In order to provide an improved lighting system for generating lighting effects, the lighting system comprises a screen, the screen having a colored design, a circuit board with at least a first lighting device and a second lighting device, wherein the first lighting device is configured to radiate a first light cone and the second lighting device is configured to radiate a second light cone and wherein the first light cone and the second light cone intersect on the screen, and a controller for modifying the first light cone independently of the second light cone.

20 Claims, 8 Drawing Sheets

JUKEBOX OR VENDING MACHINE HAVING A LIGHTING SYSTEM

RELATED APPLICATION

This application claims priority to German Patent Application No. 10 2007 012 396.7, filed in the German Patent Office on Mar. 15, 2007.

BACKGROUND INFORMATION

The invention relates to a jukebox or vending machine provided with a lighting system. The invention also relates to a method for illuminating a jukebox or vending machine.

In order to increase the attractiveness of jukeboxes or vending machines for a user, such machines are usually equipped with acoustic and/or visual elements that attract the attention of the potential user. Examples of visual elements include rotating light pillars with changing colors, areas illuminated in color, illuminated operating elements, graphic equalizers and the like. The lighting effects are generated, for example, by simple combination of mechanical rollers, rotating discs, etc. in front of a light source, or also by simple selective activation of light sources, for example LEDs (light emitting diodes).

SUMMARY OF THE INVENTION

In one aspect, the present invention provides a jukebox, amusement game or vending machine with an improved lighting system for generating lighting effects.

According to at least one aspect of the invention, the jukebox, amusement game and/or vending machine having a lighting system comprises a screen, a circuit board with at least a first lighting device and a second lighting device, wherein the first lighting device is configured to radiate a first light cone and the second lighting device is configured to radiate a second light cone and wherein the first light cone and the second light cone intersect on the screen, and a controller, wherein the screen has a colored design and the controller is configured to modify the first light cone independently of the second light cone.

The lighting system, according to at least one aspect of the invention, makes improved lighting effects possible. The screen is designed according to this aspect of the invention in such a way that any modification of the light cone illuminating the screen causes a lighting effect that generates a movement and/or change in the image theme on the screen. According to at least one aspect of the invention, this effect is achieved, in particular, by at least one colored image theme on the screen, wherein the inventive light effect is already engendered by imparting at least two colors (which can also be black-white, black-grey, etc.) or tones of color (e.g. light-dark) to the image theme. If the lighting devices located behind the screen are modified independently of each other by the controller, this produces an effect in the image—depending on its design—such as undulating movement of flowing water, pulsating flowers, changing patterns in a carpet of colors, etc. The lighting system may achieve not only deliberate color transitions in individual areas of a colored or gaily colored screen, but also wave effects, wipe effects, cross-fades and rotational movements in addition.

In one particularly preferred embodiment, the controller is configured to modify the brightness and/or the color of the first and/or second light cone. Each lighting device is arranged on the circuit board to illuminate a certain part of the screen. It is preferred that the positions of each respective lighting device and of the part of the screen illuminated by its light cone are stored in the controller. The controller modifies the brightness and/or the color of the respective light cone, depending on the input signal received by the controller, in order to achieve a certain lighting effect. In this way, the visual impression conveyed by the screen is changed by controlled activation of the various lighting devices by the controller.

The first and second lighting devices are preferably located at substantially equal distances from the screen. The circuit board on which the first and second lighting devices are disposed may be arranged substantially parallel to the screen in order to allow uniform illumination of the screen.

In another embodiment, the first and/or the second light cone has an aperture angle in a range between 60° and 160°, in particular between 100° and 140°. In this arrangement, a particularly suitable intersection of the light cones on the screen, in relation to the number of lighting device(s), is achieved.

Another particularly preferred embodiment is one in which the lighting system further includes a scatter filter located between the circuit board and the screen. (See, for example, drawing identifier 22 in FIGS. 1*c* and 1*d*). In one embodiment, the scatter filter is preferably located or imprinted on that side of the screen which faces the lighting devices, in order to improve the visual effect.

In another embodiment, the first and/or the second lighting devices are LEDs, in particular RGB-LEDs. LEDs are particularly advantageous on account of their low energy consumption and their long life. By additively mixing secondary colors, RGB-LEDs (red, green, blue LEDs) permit the generation of white light, as well as any other color, by increasing or reducing the red, blue or green component as required.

In one particularly preferred embodiment, the circuit board further includes third and fourth lighting devices, wherein the first, second, third and fourth lighting devices are arranged as an array. Optimal illumination of the screen is achieved by the preferably uniform arrangement and/or pattern of the lighting devices in the form of an array.

The first and second lighting devices are preferably arranged at a distance of between 0.5 cm and 10 cm, in particular between 2 cm and 4 cm from one another. By arranging the lighting devices on the circuit board in this manner, an arrangement adapted to the lighting characteristics of the lighting devices and optimized for illumination of the screen is made possible.

The first and second lighting devices are preferably arranged at a distance of between 1 cm and 6 cm, in particular between 2 cm and 4 cm from the screen. Such an arrangement is particularly preferred in order to achieve suitable illumination of the screen by the lighting devices and suitable intersecting of the light cones radiated by the lighting devices, so that a desired lighting effect is achieved.

Another particularly preferred embodiment is one in which the distance between the first and second lighting devices is substantially equal to the distance between the first and/or second lighting devices and the screen. By means of this special or predetermined layout, the ratio of the distance between the various lighting devices, and the distance between the lighting devices and the screen, is optimized to achieve the lighting effects controlled by the controller.

In another preferred embodiment, the controller for modifying the first light cone independently of the second light cone is configured according to an external trigger signal. The external trigger signal preferably represents known effects such as those produced by a light-organ, for example the beat of the music being played, with the result that, with the invention, certain effects can be triggered in a controlled manner.

The invention also relates to a method for illuminating a jukebox and/or vending machine, comprising the steps of illuminating a screen with a first light cone, illuminating the screen with a second light cone, wherein the first light cone and the second light cone intersect on the screen, and modifying the first light cone independently of the second light cone, wherein the screen may include colored design.

BRIEF DESCRIPTION OF THE DRAWINGS

In the course of the detailed description to follow, reference will be made to the attached drawings. These drawings illustrate different aspects of the present inventions and, where appropriate, reference numerals illustrating like structures, components, materials and/or elements in different figures are labeled similarly. It is understood that various combinations of the structures, components, materials and/or elements, other than those specifically illustrated, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed and/or illustrated separately herein.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

Figure 1A:
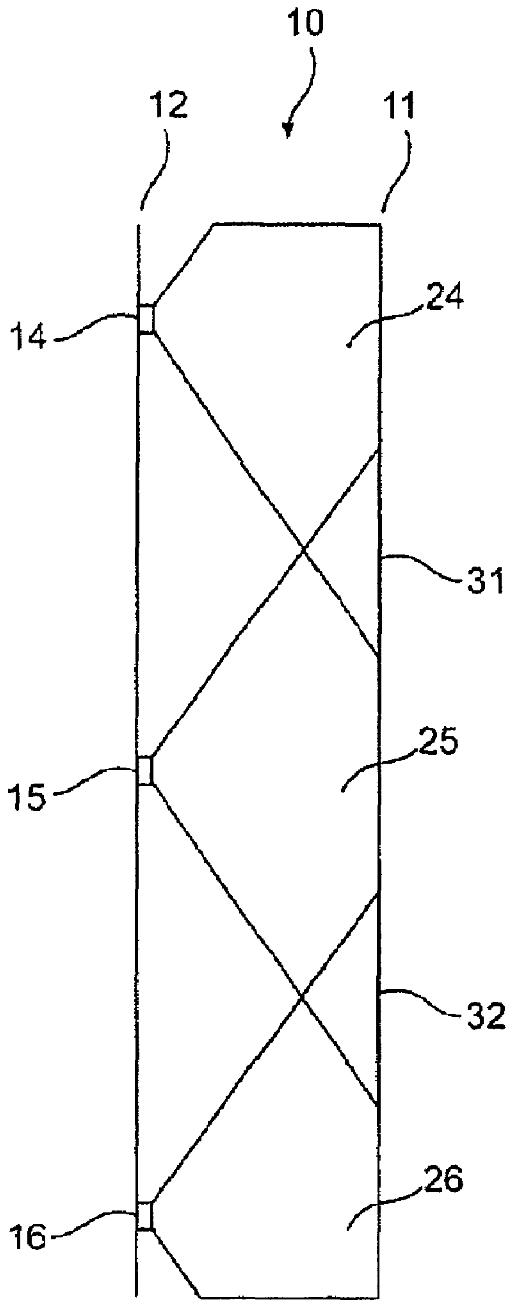
FIGS. 1*a*, 1*b*, 1*c* and 1*d* illustrate exemplary embodiments of the lighting system according to at least one aspect of the invention.

FIG. 1*a* illustrates a first exemplary embodiment of the invention. The lighting system 10 comprises a circuit board 12 and a screen 11. First lighting device 14, second lighting device 15 and third lighting device 16 are arranged on circuit board 12. Light cones 24, 25, 26 are associated with lighting devices 14, 15, 16. The light cones 24, 25 of first lighting device 14 and of second lighting device 15 intersect in area 31 of screen 11. Light cones 25, 26 of lighting devices 15, 16 intersect in area 32 of screen 11.

Figure 1B:
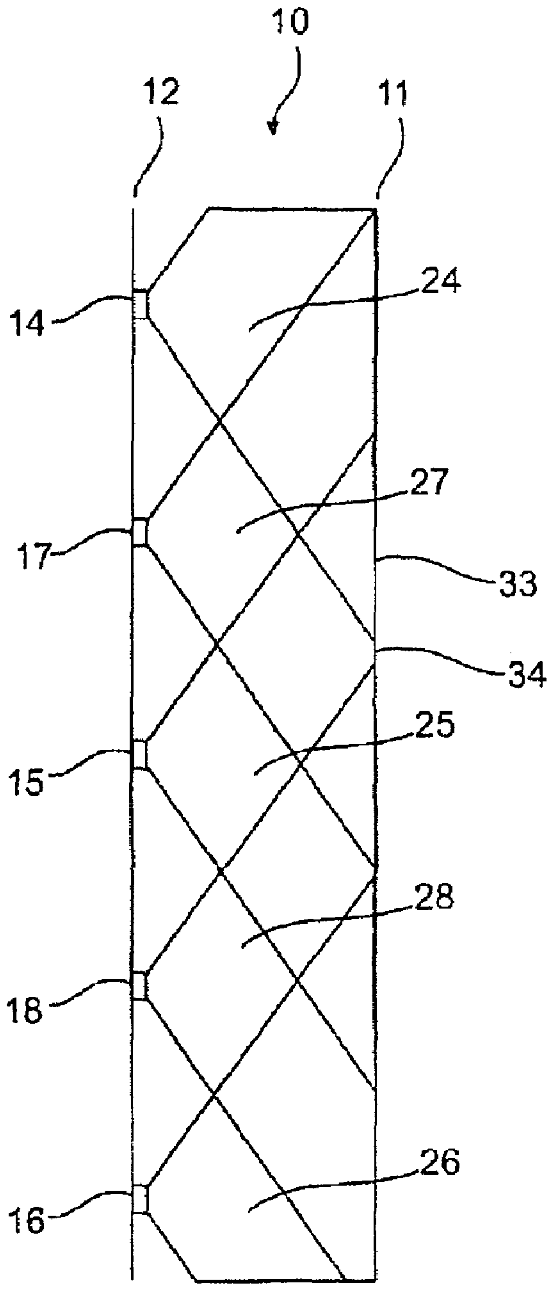
Figures 1C, 1D:
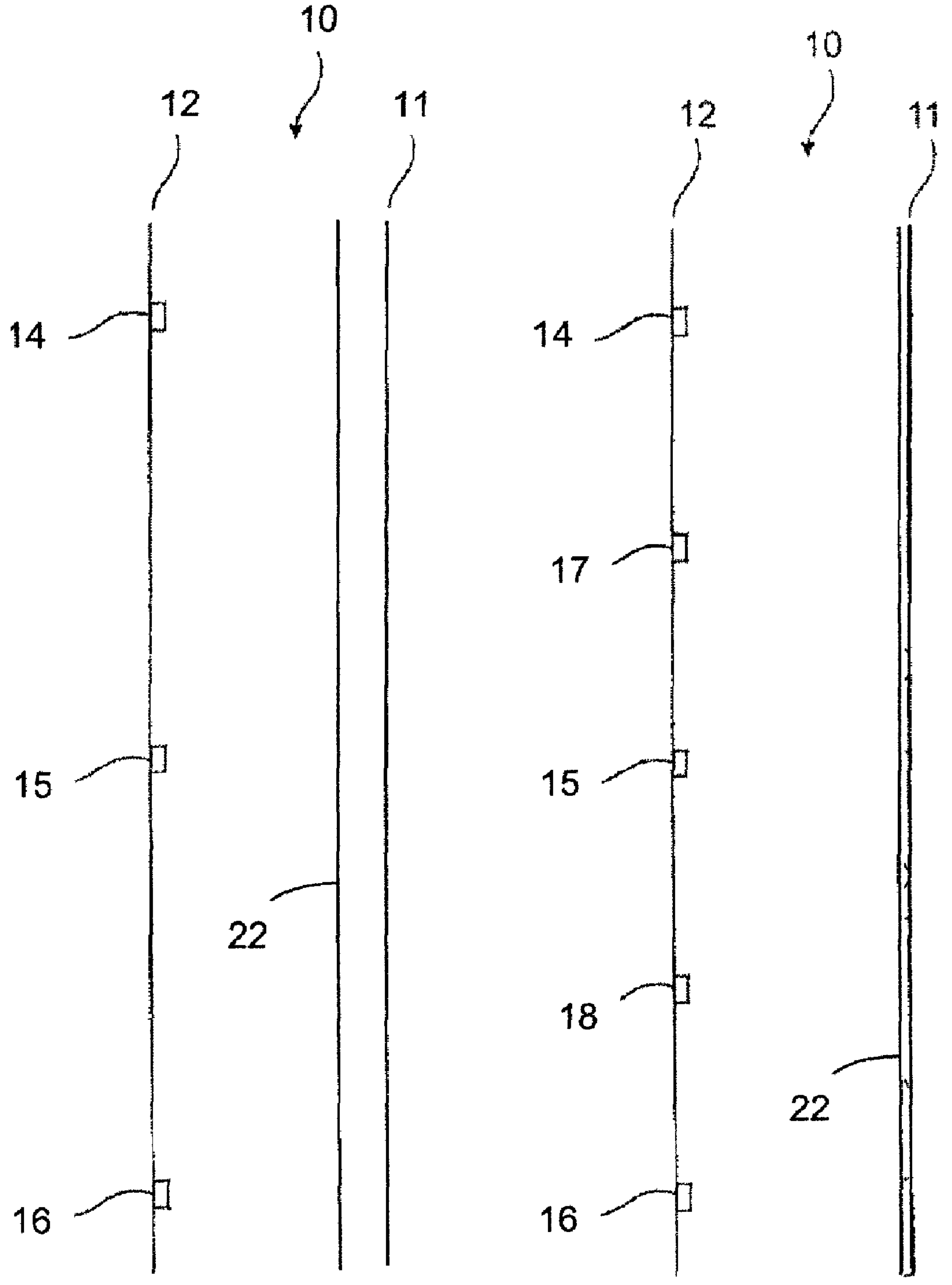

FIG. 1*b* illustrates a second exemplary embodiment of a lighting system 10, comprising a circuit board 12 and a screen 11. Lighting devices 14, 17, 15, 18, 16 are associated with light cones 24, 27, 25, 28, 26. Twice as many lighting devices are arranged on circuit board 12 of FIG. 1*b* as on circuit board 12 of FIG. 1*a*. Hence, there are larger areas of the screen at which two light cones intersect, on the one hand, as well as areas in which more than two light cones intersect, on the other hand. Light cones 24, 27 and 25 of lighting devices 14, 17, 15, for example, intersect at area 33 of screen 11. Light cones 27, 25 of lighting devices 17, 15, as another example, intersect at area 34 of screen 11.

In the exemplary embodiments illustrated in FIGS. 1*a* and 1*b*, the distance between the lighting devices, i.e. LEDs 14, 15, 16, 17, 18, to screen 11 is three centimeters. The array distance between LEDs 14, 15, 16, 17, 18 does not exceed 6 cm, i.e. the distance is 6 cm in FIG. 1*a* and 3 cm in FIG. 1*b*. By means of this arrangement, i.e. with a distance between LEDs 14, 15, 16, 17, 18 not exceeding 6 cm and a 120° aperture angle of light cones 24, 25, 26, 27, 28 of LEDs 14, 15, 16, 17, 18, a maximum beam overlap of 2.89 mm and a minimum beam overlap of 0.79 mm is ensured.

Figure 2A:
FIGS. 2*a* and 2*b* illustrate a screen with a colored design, and a circuit board provided with a plurality of lighting devices.
Figure 3:
FIG. 3 illustrates an alternative exemplary embodiment of a jukebox according to at least one aspect of the invention.

FIG. 2*a* illustrates a screen 11 which has a colored design. The colored design of screen 11 comprises an image of two peacocks. FIG. 3 illustrates an exemplary embodiment of a jukebox according to at least one aspect of the invention.

Figure 2B:
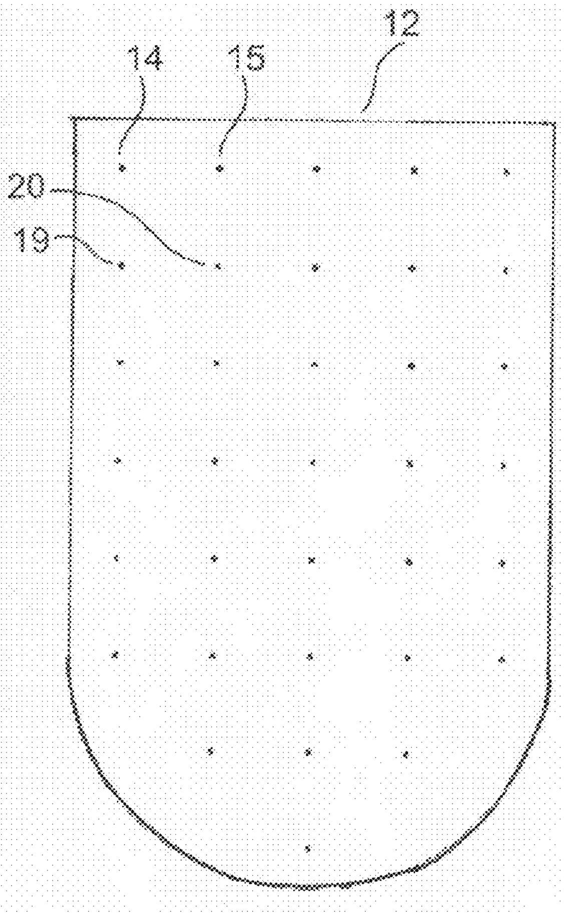

In order to make the image of the two peacocks on screen 11 as interesting as possible for the viewer by means of lighting effects, the circuit board 12 of the invention is arranged behind screen 11 as illustrated in FIG. 2*b*. Circuit board 12 of the invention comprises an array of RGB-LEDs. The array of lighting devices on circuit board 12 comprises, for example, first lighting device 14 and second lighting device 15, as illustrated in the cross-sections through circuit board 12 in FIGS. 1*a* and 1*b*, and an additional third lighting device 19 and an additional fourth lighting device 20. Circuit board 12 of the invention is adapted in such a manner to the shape of colored screen 11 that optimal illumination of the image by means of lighting effects is achieved.

Figure 4:
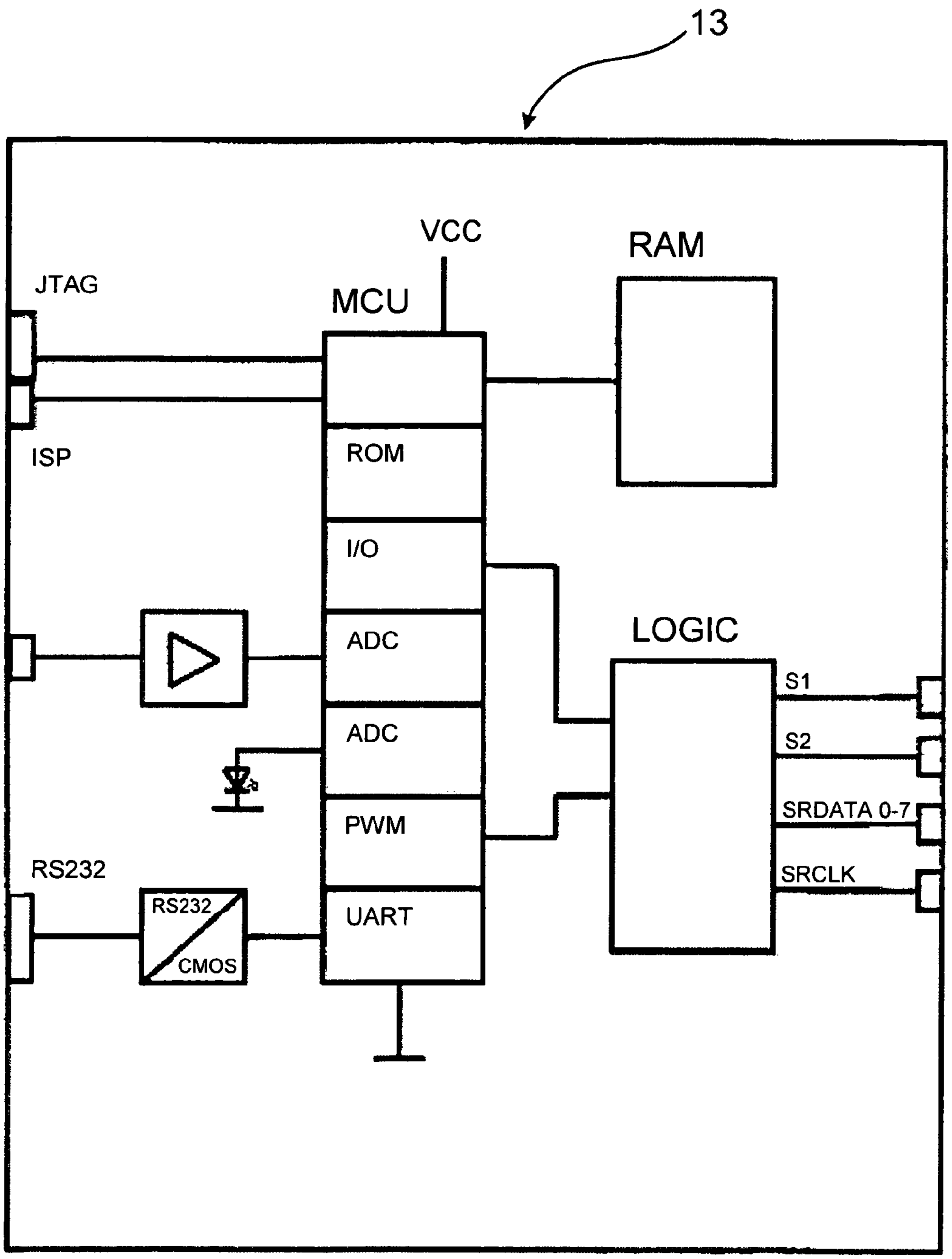
FIG. 4 illustrates in schematic form the structure of a controller according to at least one aspect of the invention.

In FIG. 4, a controller 13 according to at least one aspect of the invention is illustrated. Controller 13 comprises a microcontroller unit MCU, which is supplied with a supply voltage VCC. The MCU may be configured to communicate with a JTAG (Joint Test Action Group) unit, which tests the units and their interconnections on the circuit board. The MCU may also be coupled to an ISP (Internet service provider), from which it is able to receive information, e.g. programs for certain lighting effects, for particular pieces of music, etc., used in operating the lighting system of the invention.

Controller 13 of the invention further comprises a RAM memory and a ROM memory. Information is stored in the ROM memory about lighting devices 14, 15, 16, 17, 18, their light cones 24, 25, 26, 27, 28 and their characteristics, e.g. position, brightness, color, etc., with regard to the illumination of screen 11. Programs for specific lighting effects can be stored in the RAM memory. An input/output (I/O) unit passes data from the MCU, the RAM and/or the ROM to a control unit LOGIC for controlling lighting devices 14, 15, 16, 17, 18 of circuit board 12.

Controller 13 may further include an external interface (for example, an RS232 serial interface), through which it is able to receive an external trigger signal. Controller 13 may have several external trigger inputs which may be used in different ways, e.g. to start the lighting effects animation when a coin is inserted, or to start the animation when a customer approaches, or to start the animation when pieces of music begin, etc. . . .

The RS232 serial interface may be connected to an UART (universal asynchronous receiver transmitter) unit, which is used for asynchronous data transmission. The controller 13 also has a PWM (pulse wide modulation) unit with which the brightness of the LEDs is controlled. The output signal from the PWM unit is likewise input into control unit LOGIC.

Figure 5:
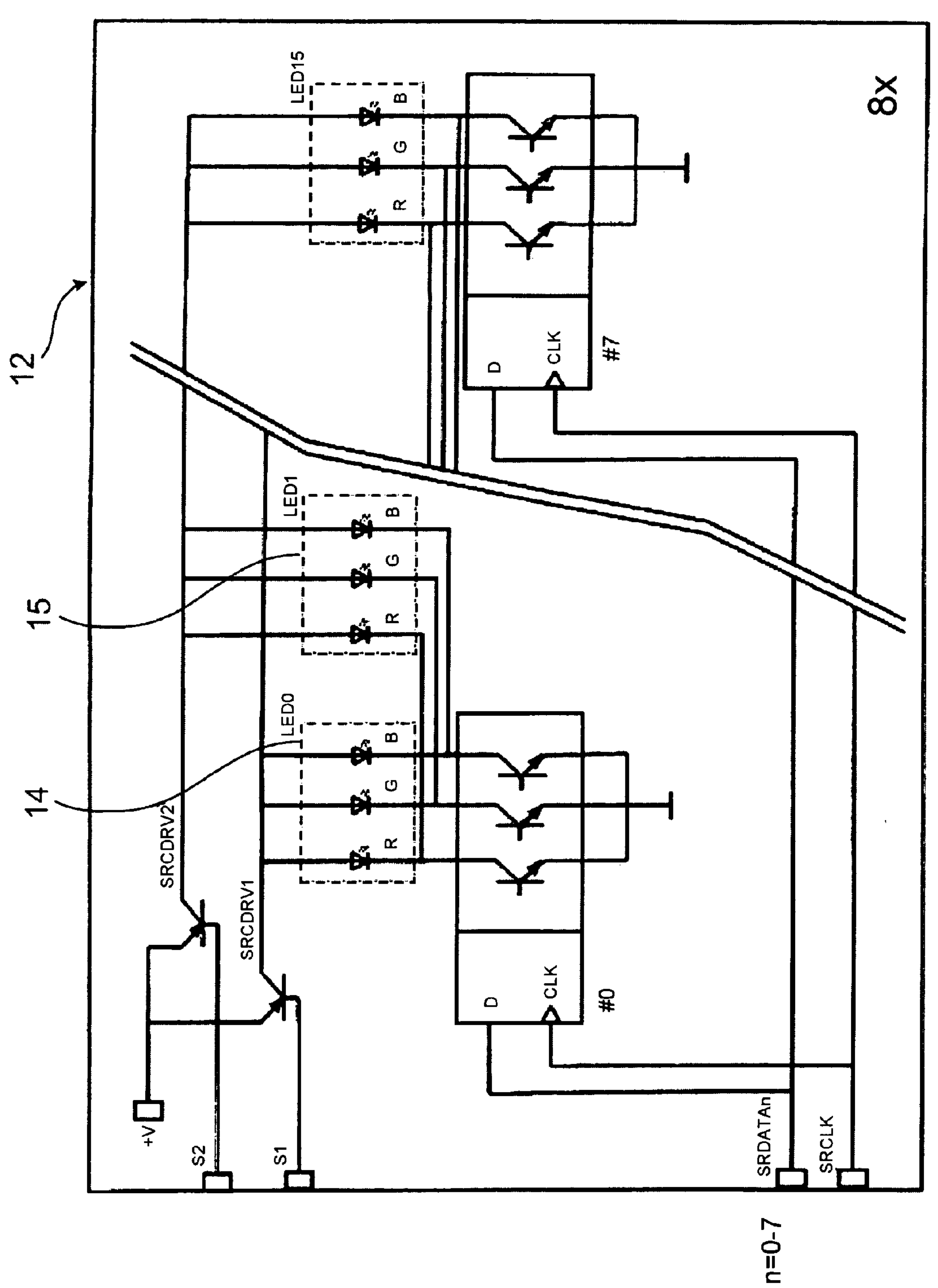
FIG. 5 illustrates in schematic form the layout of a circuit board according to at least one aspect of the invention.

The control unit LOGIC converted the received signals into control signals for LEDs 14, 15, 16, 17, 18 on circuit board 12. The control unit LOGIC outputs control signals S1 and S2, as well as shift register data SRDATA 0-7 and the shift register clock. These signals form the input signals for lighting devices 14, 15, 16, 17, 18 on circuit board 12, as is illustrated in FIG. 5. The individual lighting devices 14, 15, 16, 17, 18 are thus triggered by a microprocessor circuit, so it is possible to store the effects achieved in the form of software programs. The matrix array of lighting devices 14, 15, 16, 17, 18 allows the brightness and color of any chosen point on screen 11 to be controlled.

FIG. 5 illustrates two parts of an exemplary embodiment of circuit board 12, the middle part of which has been left out due to redundancy. Circuit board 12 illustrated in FIG. 5 includes a total of 16 lighting devices, here LED 0-15, wherein first lighting device 14 (LED 0) and second lighting device (LED 1) form the first row. Lighting devices LED2 and LED3 form the second row, etc., and, due to the resultant redundancy, only the last lighting device LED 15 of the last row is included in FIG. 5.

Each of lighting device 14, 15, 16, 17, 18 LEDi, where i=0-15, comprises three color LEDs, i.e., one each for red, for green and for blue. The inputs of the color LEDs of lighting devices 14, 15, 16, 17, 18 are driven by control signals S1 and S2, and by SRCDRV 1 and SRCDRV 2.

Figure 6:
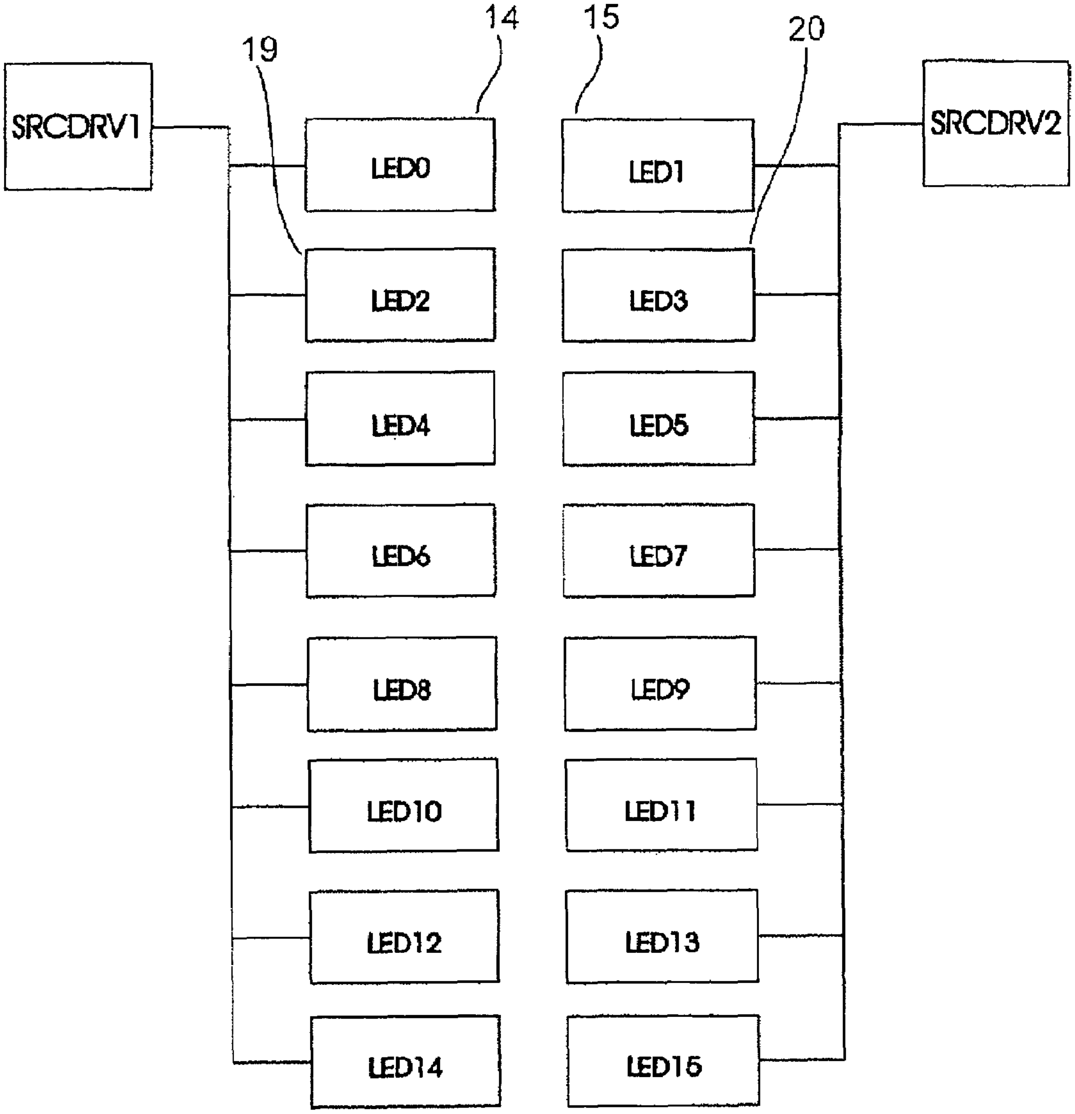
FIG. 6 illustrates a schematic view of an array of lighting devices on the circuit board illustrated in FIG. 4.

The output terminals of the identically colored LEDs of a row of lighting devices 14, 15 are each connected to a collector terminal of a bipolar transistor. The base of the bipolar transistor is controlled by shift register data SRDATAn, where n=0-7, and by the shift register clock. As illustrated in FIG. 5, the LEDs are arranged in a matrix array in which the anodes are grouped, in columns which can be cyclically activated, as illustrated in FIG. 6. The respective columns are activated in like manner to the rows of diodes. The identically colored cathodes in a row are connected as a group to a group driver.

FIG. 6 illustrates in schematic form the array of lighting devices LEDi on the circuit board 12 illustrated in FIG. 5. The array or matrix of lighting devices LEDi has two lighting devices in each row and eight lighting devices in each column. The lighting devices are driven in columns by control signals S1, S2 and by SRCDRV 1 and SRCDRV 2. Lighting devices 14, 15, 19, 20 in FIG. 6 correspond, for example, to those in FIG. 2*b*.

Figure 7:
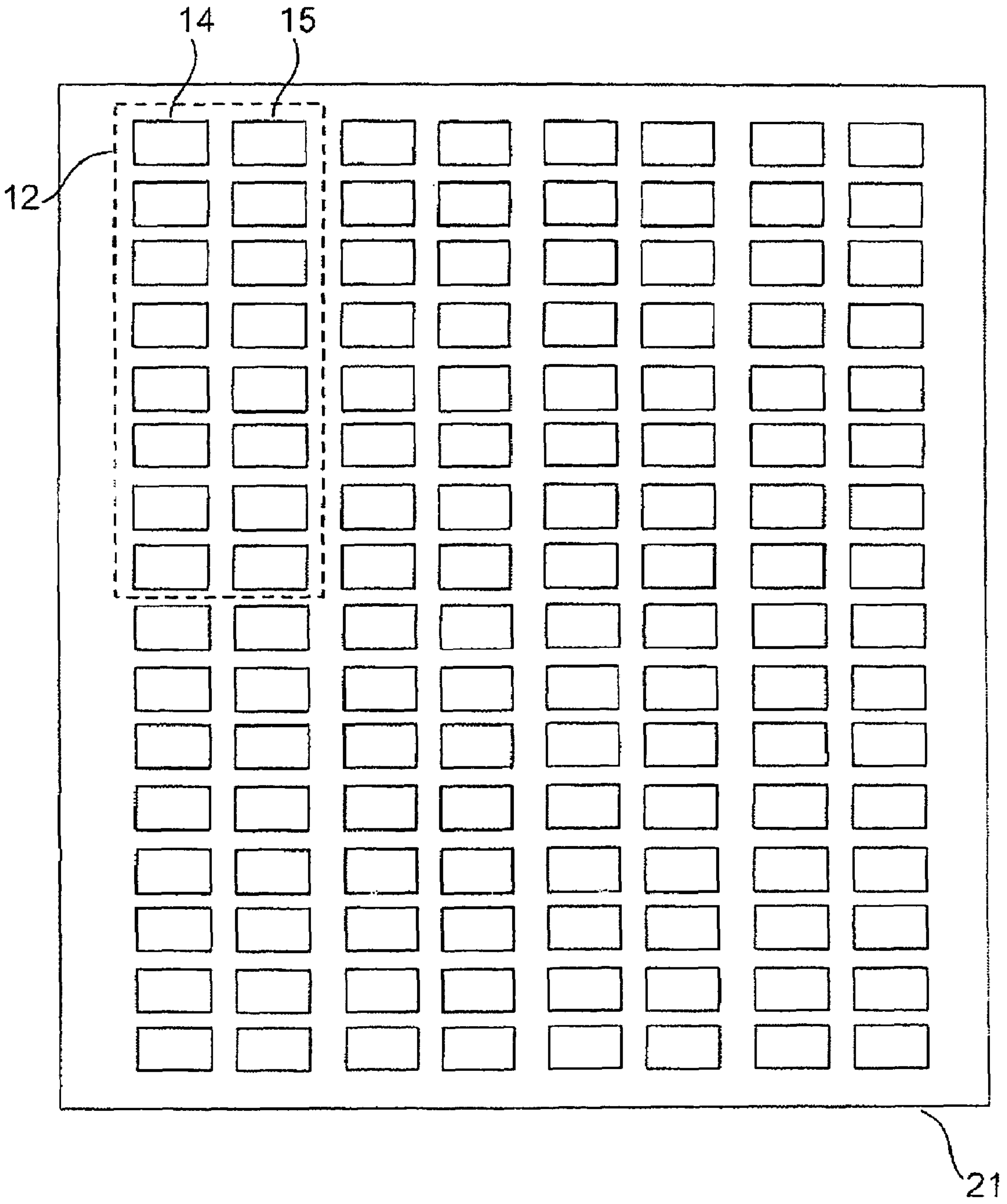
FIG. 7 illustrates an exemplary arrangement of a plurality lighting devices on the circuit board illustrated in FIGS. 4 and 5.

FIG. 7 illustrates a lighting arrangement on a base plate 21, the lighting arrangement consisting of individual circuit boards 12 provided with a first lighting device 14 and a second lighting device 15. Circuit board 12 may have a different number of lighting devices. Moreover, it is possible for different lighting arrangements 21 to be achieved by devices of different layouts on circuit boards 12 to meet special or predetermined requirements (see, for example, the rounded screen in FIG. 2*a*).

In one embodiment, to generate a suitable animation or a suitable lighting effect for a screen area of approximately 225×520 mm, a total of 128 uniformly arranged lighting devices, for example, are used. Individual circuit boards 12 with 2×8=16 lighting devices can be "pluggably" arranged on a base plate 21 such that the number of lighting devices can be varied according to the size of the screen 11 to be illuminated.

The inventive arrangement of a colored printed screen 11 and RGB-LEDs of an electrical matrix located therebehind makes it possible for each individual colored diode to be operated with its own color temperature. It is possible in this way to produce all the secondary colors obtainable by mixing the primary colors red, green and blue. In addition, the superordinate microprocessor control unit makes it possible for a plurality of LEDs to be driven in groups, in order to generate different, autonomous changes of colors and deviating frequencies. This produces the impression that the predetermined areas of the screen compete with each other in respect of their coloring, as a result of which it is possible to generate different patterns of movement.

What is claimed is:

1. A jukebox and/or vending machine having a lighting system, the lighting system comprising:

a screen including a colored design thereon, a circuit board with at least a first lighting device and a second lighting device, the first lighting device being configured to radiate a first light cone and the second lighting device to radiate a second light cone, wherein the first and/or the second light cone include an aperture angle in a range of between 60° and 160°, and wherein the first light cone and the second light cone intersect on the screen, and a controller electrically coupled to the first and second lighting devices, wherein the controller is configured to modify the first light cone independently of the second light cone.

2. The jukebox and/or vending machine of claim 1, wherein the controller is configured to modify the brightness and/or color of the first and/or second light cone.

3. The jukebox and/or vending machine of claim 1, wherein the first and second lighting devices are located at substantially equal distances from the screen.

4. The jukebox and/or vending machine of claim 1, wherein the first and/or the second light cone include an aperture angle in a range of between 100° and 140°.

5. The jukebox and/or vending machine of claim 1, wherein the first and/or the second lighting devices are LEDs.

6. The jukebox and/or vending machine of claim 1, wherein the first and/or the second lighting devices are RGB-LEDs.

7. The jukebox and/or vending machine of claim 1, wherein the circuit board further includes third and fourth lighting devices, wherein the first, second, third and fourth lighting devices are arranged as an array.

8. The jukebox and/or vending machine of claim 1, wherein the first and second lighting devices are arranged at a distance of between 0.5 cm and 10 cm from one another.

9. The jukebox and/or vending machine of claim 1, wherein the first and second lighting devices are arranged at a distance of between 2 cm and 4 cm from one another.

10. The jukebox and/or vending machine of claim 1, wherein the first and second lighting devices are arranged at a distance of between 1 cm and 6 cm from the screen.

11. The jukebox and/or vending machine of claim 1, wherein the first and second lighting devices are arranged at a distance of between 2 cm and 4 cm from the screen.

12. The jukebox and/or vending machine of claim 1, wherein the distance between the first and second lighting devices is substantially equal to the distance between the first and/or second lighting devices and the screen.

13. The jukebox and/or vending machine of claim 1, wherein the controller receives an external trigger signal, and in response thereto, modifies the first light cone independently of the second light cone.

14. A method for illuminating a jukebox and/or vending machines having a screen wherein the screen includes a colored design, the method comprising:

illuminating the screen with a first light cone, illuminating the screen with a second light cone, the first light cone and the second light cone intersect on the screen, wherein the first and/or the second light cone include an aperture angle in a range of between 60° and 160°, and independently modifying the first light cone relative to the second light cone.

15. The method of claim 14, wherein illuminating the screen with a second light cone further includes illuminating the screen with the second light cone having an aperture angle in a range of between 60° and 160°.

16. A jukebox and/or vending machine having a lighting system, the lighting system comprising:

a screen including a colored design thereon, a circuit board with at least a first lighting device and a second lighting device, the first lighting device being configured to radiate a first light cone and the second lighting device to radiate a second light cone, wherein the first light cone and the second light cone intersect on the screen, a scatter filter disposed between the circuit board and the screen, and a controller electrically coupled to the first and second lighting devices, wherein the controller is configured to modify the first light cone independently of the second light cone.

17. The jukebox and/or vending machine of claim 16, wherein the scatter filter is disposed or imprinted on a side of the screen which faces the first and second lighting devices.

18. The jukebox and/or vending machine of claim 16, wherein the first and second lighting devices are located at substantially equal distances from the screen.

19. The jukebox and/or vending machine of claim 16, wherein the first and/or the second light cone include an aperture angle in a range of between 60° and 160°.

20. The jukebox and/or vending machine of claim 16, wherein the first and/or the second lighting devices are LEDs.

* * * * *